United States Patent
Iwabuchi et al.

(10) Patent No.: US 11,845,450 B2
(45) Date of Patent: Dec. 19, 2023

(54) VEHICLE CAPABLE OF CHANGING VEHICLE CHARACTERISTICS

(71) Applicant: SUBARU CORPORATION, Tokyo (JP)

(72) Inventors: Norio Iwabuchi, Tokyo (JP); Tatsuya Hayashi, Tokyo (JP); Toshiya Godai, Tokyo (JP); Kazuhiro Nagae, Tokyo (JP); Katsuo Senmyo, Tokyo (JP); Hiroyuki Tahara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 64 days.

(21) Appl. No.: 16/931,753

(22) Filed: Jul. 17, 2020

(65) Prior Publication Data
US 2021/0031787 A1 Feb. 4, 2021

(30) Foreign Application Priority Data
Jul. 31, 2019 (JP) .................. 2019-140772

(51) Int. Cl.
*B60W 50/00* (2006.01)
*B60W 50/14* (2020.01)
*G06F 16/242* (2019.01)
*G07C 5/08* (2006.01)

(52) U.S. Cl.
CPC ........ *B60W 50/0098* (2013.01); *B60W 50/14* (2013.01); *G06F 16/243* (2019.01); *G07C 5/085* (2013.01)

(58) Field of Classification Search
None
See application file for complete search history.

(56) References Cited

U.S. PATENT DOCUMENTS

| | | | |
|---|---|---|---|
| 10,801,425 B2 * | 10/2020 | Young | F02D 41/10 |
| 2019/0376598 A1 * | 12/2019 | Humble | F16H 61/0213 |
| 2020/0207412 A1 * | 7/2020 | Al Assad | E01C 7/356 |
| 2021/0370967 A1 * | 12/2021 | Valeri | B60W 50/04 |

FOREIGN PATENT DOCUMENTS

| | | | |
|---|---|---|---|
| JP | 2001253219 A | * | 9/2001 |
| WO | 2017/213064 A1 | | 12/2017 |

* cited by examiner

*Primary Examiner* — Abdhesh K Jha
(74) *Attorney, Agent, or Firm* — TROUTMAN PEPPER HAMILTON SANDERS LLP

(57) ABSTRACT

A vehicle includes an information storage, an information notifier, a reply acquirer, a vehicle characteristic specifier, and a vehicle characteristic setter. The information storage is configured to store question information including a plurality of questions. The information notifier is configured to extract a question from the stored question information in accordance with a predetermined rule and notify the question through a notification device. The reply acquirer is configured to acquire a reply to the notified question. The vehicle characteristic specifier is configured to specify a vehicle characteristic based on the reply. The vehicle characteristic setter is configured to set the specified vehicle characteristic is the vehicle.

7 Claims, 7 Drawing Sheets

FIG. 4

| QUESTION | REPLY | VEHICLE CHARACTERISTICS |
|---|---|---|
| (1) Do you think fuel economy performance is more important than acceleration performance during ECO mode? | I really think so. | Acceleration Performance 1p, Fuel Economy Performance 8p |
| | I think so. | Acceleration Performance 2p, Fuel Economy Performance 7p |
| | I do not really think so. | Acceleration Performance 3p, Fuel Economy Performance 6p |
| | I never think so. | Acceleration Performance 4p, Fuel Economy Performance 5p |
| (2) Do you think lightness is more important than feeling in steering operation performance during ECO mode? | I really think so. | Steering Operation Performance 1p |
| | I think so. | Steering Operation Performance 2p |
| | I do not really think so. | Steering Operation Performance 3p |
| | I never think so. | Steering Operation Performance 4p |
| (3) Do you think lightness is more important than feeling in braking operation performance during ECO mode? | I really think so. | Braking Operation Performance 1p |
| | I think so. | Braking Operation Performance 2p |
| | I do not really think so. | Braking Operation Performance 3p |
| | I never think so. | Braking Operation Performance 4p |
| (4) Do you thank acceleration performance is more important than fuel economy performance during SPO mode? | I really think so. | Acceleration Performance 8p, Fuel Economy Performance 1p |
| | I think so. | Acceleration Performance 7p, Fuel Economy Performance 2p |
| | I do not really think so. | Acceleration Performance 6p, Fuel Economy Performance 3p |
| | I never think so. | Acceleration Performance 5p, Fuel Economy Performance 4p |
| (5) Do you think feeling is more important than lightness in steering operation performance during SPO mode? | I really think so. | Steering Operation Performance 4p |
| | I think so. | Steering Operation Performance 3p |
| | I do not really think so. | Steering Operation Performance 2p |
| | I never think so. | Steering Operation Performance 1p |
| (6) Do you think feeling is more important than lightness in braking operation performance during SPO mode? | I really think so. | Braking Operation Performance 4p |
| | I think so. | Braking Operation Performance 3p |
| | I do not really think so. | Braking Operation Performance 2p |
| | I never think so. | Braking Operation Performance 1p |

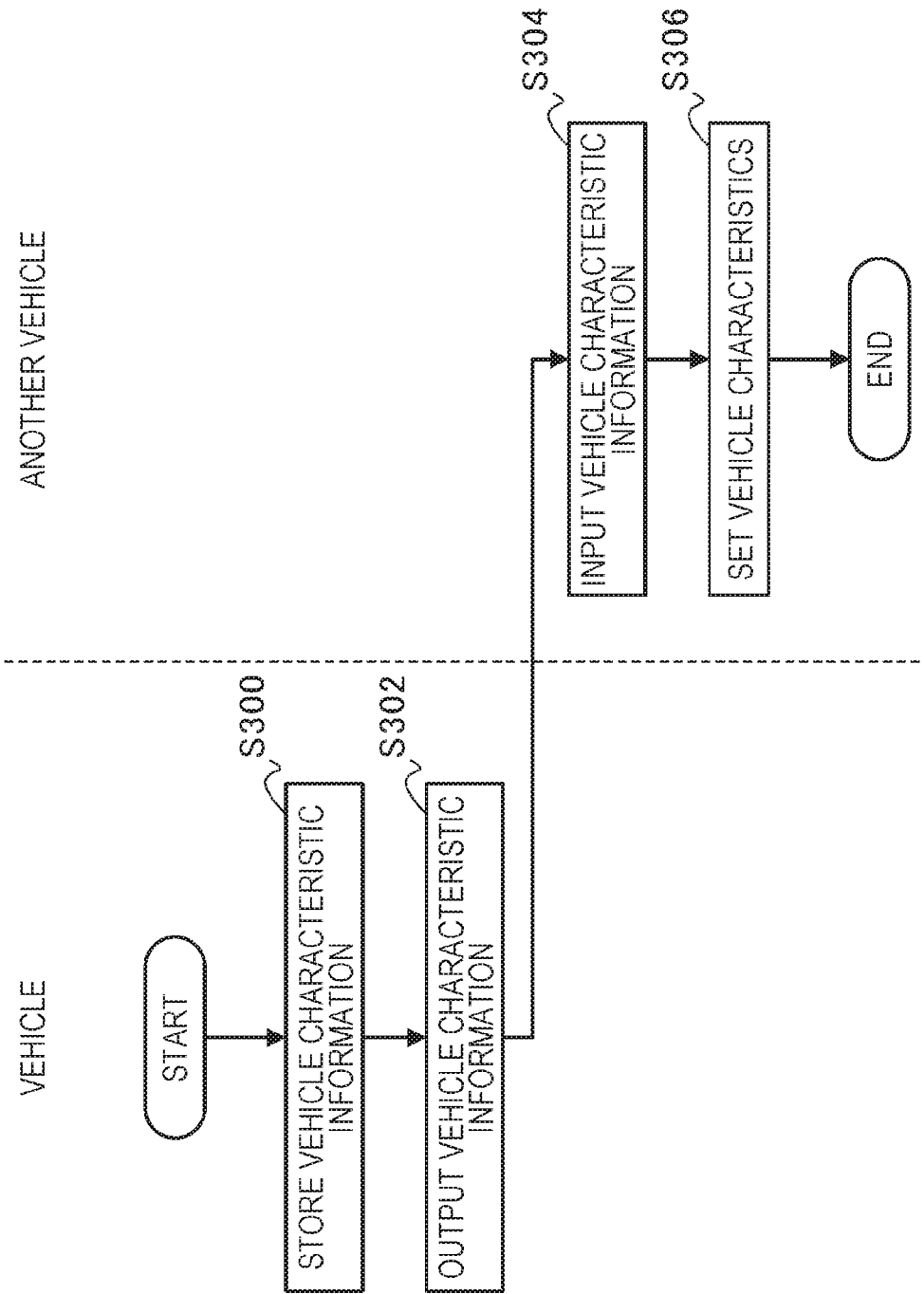

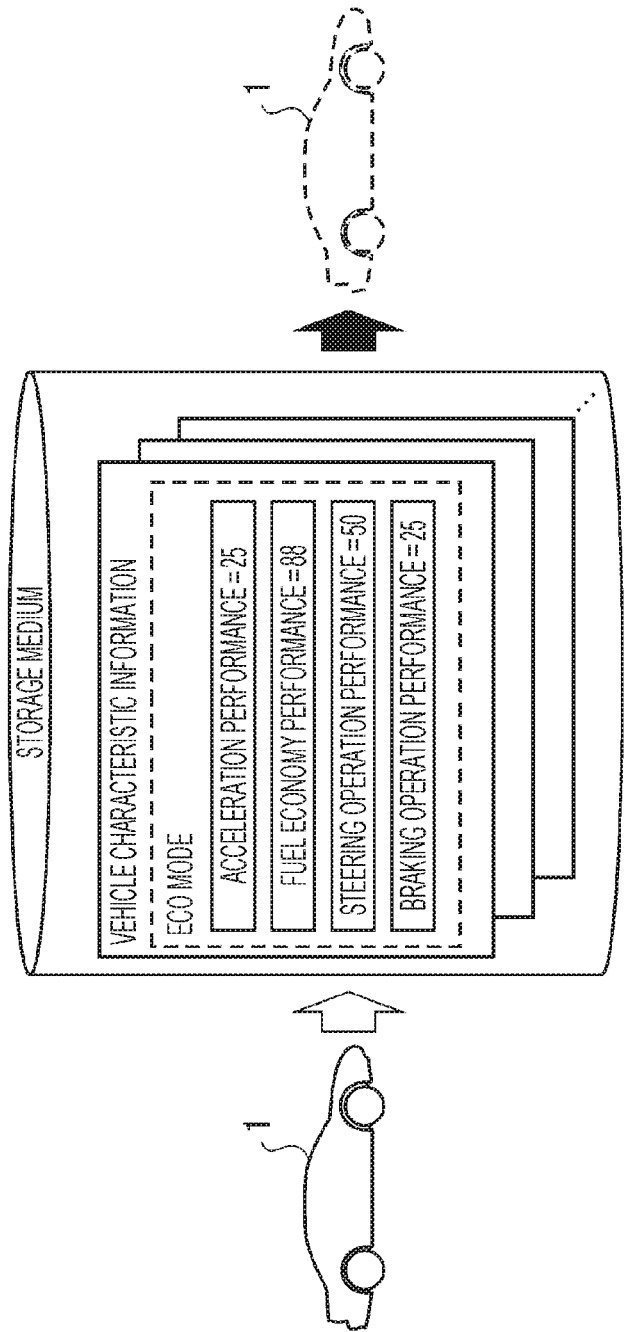

VEHICLE CAPABLE OF CHANGING VEHICLE CHARACTERISTICS

CROSS-REFERENCE TO RELATED APPLICATIONS

The present application claims priority from Japanese Patent Application No. 2019-140772 filed on Jul. 31, 2019, the entire contents of which are hereby incorporated by reference.

BACKGROUND

The disclosure relates to a vehicle that can change vehicle characteristics.

In recent years, vehicle technologies that provide vehicle characteristics that suite driver's habits and preferences have been developed. There have been disclosed a technology that, in order to reduce the load on the driver, classifies vehicle characteristics into categories, learns a model that represents vehicle characteristics for each category, and performs driving control in accordance with the model for each category (see, for example, International Publication No. 2017/213064).

SUMMARY

An aspect of the disclosure provides a vehicle including an information storage, an information notifier, a reply acquirer, a vehicle characteristic specifier, and a vehicle characteristic setter. The information storage is configured to store question information including a plurality of questions. The information notifier is configured to extract a question from the stored question information in accordance with a predetermined rule and notify the question through a notification device. The reply acquirer is configured to acquire a reply to the notified question. The vehicle characteristic specifier is configured to specify a vehicle characteristic based on the reply. The vehicle characteristic setter is configured to set the specified vehicle characteristic in the vehicle.

An aspect of the disclosure provides a vehicle including circuitry. The circuitry is configured to store question information including a plurality of questions. The circuitry is configured to extract a question from the stored question information in accordance with a predetermined rule and notify the question through a notification device. The circuitry is configured to acquire a reply to the notified question. The circuitry is configured to specify a vehicle characteristic on a basis of the reply. The circuitry is configured to set the specified vehicle characteristic in the vehicle.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 4 illustrates specific aspects of vehicle characteristics;

FIG. 7 is a flowchart illustrating a vehicle characteristic transfer process; and FIG. 8 illustrates the vehicle characteristic transfer process.

DETAILED DESCRIPTION

In a vehicle that allows a driver to change vehicle characteristics in accordance with the driver's habits and preferences, as the driver becomes accustomed to driving of the vehicle, the driver may readjust the vehicle characteristics or reset the vehicle characteristics for refreshment.

However, if there are few types of vehicle characteristics that can be changed, the driver can modify the vehicle characteristics in limited ways, and the advantage of adjusting the vehicle characteristics is reduced. On the other hand, if there are too many types of vehicle characteristics that can be changed, unless the driver notices the function, the function is useless.

If there are few options for the same type of vehicle characteristic, the setting is rough, and the driver feels an unpleasant sensation due to a gap that occurs when the setting is changed. On the other hand, if there are too many options for the same type of vehicle characteristics, the driver cannot specify optimal setting among the too many options before the driver becomes accustomed to driving, and it is difficult to set vehicle characteristic that satisfy the driver.

It is desirable to provide a vehicle that enables driving with appropriate vehicle characteristics.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Vehicle 1

Figure 1:
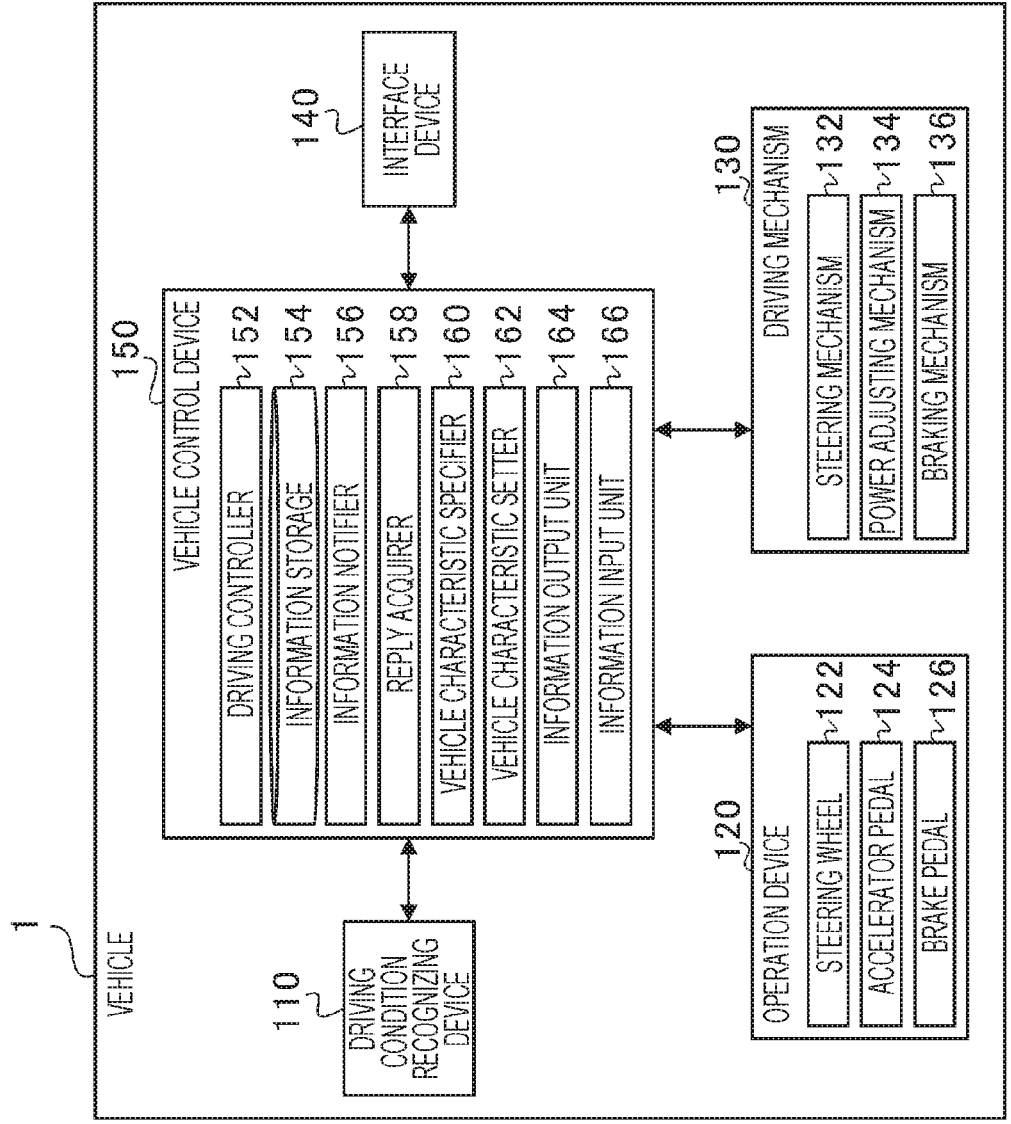
FIG. 1 is a block diagram illustrating the configuration of a vehicle.

FIG. 1 is a block diagram illustrating the configuration of a vehicle 1. The vehicle 1 includes a driving condition recognizing device 110, an operation device 120, a driving mechanism 130, an interface device 140, and a vehicle control device (ECU: electronic control unit) 150. A system including a plurality of vehicles 1 may be referred to as a "vehicle system".

The driving condition recognizing device 110 acquires the driving conditions of the vehicle 1, for example, through an imaging device (including an in-car camera and an external camera), a car navigation system, a global positioning system (GPS), an inertial measurement unit (IMU), various sensors, and the like.

The operation device 120 receives an operation input by the driver through a steering wheel 122, an accelerator pedal 124, a brake pedal 126, and the like. The driving mechanism 130 assists driving of the vehicle 1 through a steering mechanism 132, a power adjusting mechanism 134, a braking mechanism 136, and the like.

For example, the steering mechanism 132 controls the steering angle of wheels mainly in accordance with an operation input of the steering wheel 122. The power adjusting mechanism 134 controls the rotation speed of the engine mainly in accordance with an operation input of the accelerator pedal 124. The braking mechanism 136 controls the braking force of the vehicle 1 mainly in accordance with an operation input of the brake pedal 126.

The interface device 140 is electrically coupled to external devices (peripherals), such as a storage medium, a mobile terminal, a computer, and communication equipment, via a communication port, such as USB, LAN, and the like; and transmits data to and receives data from the external devices. The interface device 140 may transmit and receive the data via wired communication or wireless communication. The storage medium is a medium that electrically stores data (information) by using a semiconductor memory and is configured to be attachable to and removable from the interface device 140 and to be portable. A semiconductor memory of a server on a cloud platform may be used as the storage medium through the interface device 140. The vehicle control device 150 is constituted by a semiconductor integrated circuit that includes a central processing unit (CPU), a ROM storing programs and the like, a RAM as a work area, and the like. The vehicle control device 150 also functions, by running programs, as a driving controller 152, an information storage 154, an information notifier 156, a reply acquirer 158, a vehicle characteristic specifier 160, a vehicle characteristic setter 162, an information output unit 164, and an information input unit 166.

The driving controller 152 identifies a three-dimensional object, such as a vehicle in front of the vehicle 1, based on, for example, an image captured by an imaging device as the driving condition recognizing device 110. Then, the driving controller 152 controls the driving mechanism 130 based on the position and velocity of the three-dimensional object and an operation input by the driver to the operation device 120. The driving controller 152 can also control the present vehicle so as to avoid collision with the three-dimensional object (collision avoidance control) and to keep a safe distance to the vehicle in front of the present vehicle (adaptive cruise control).

The driver can change the vehicle characteristics of the present vehicle in accordance with the driver's habits and preferences. However, if there are few types of vehicle characteristics that can be changed, the driver can modify the vehicle characteristics in limited ways. On the other hand, if there are too many types of vehicle characteristics that can be changed, unless the driver notices the function, the function is useless.

If there are few or for the same type of vehicle characteristics, the setting is rough, and the driver feels an unpleasant sensation due to a gap that occurs when the setting is changed. On the other hand, if there are too many options for the same type of vehicle characteristics, the driver cannot specify optimal setting among the too many options before the driver becomes accustomed to driving, and it is difficult to set vehicle characteristics that satisfy the driver. Thus, it is desirable to allow the driver to perform driving with appropriate vehicle characteristics by accurately reflecting vehicle characteristics that the driver desires.

For example, the information storage 154 stores question information including a plurality of questions for obtaining vehicle characteristics in accordance with the driver's habits and preferences. The information notifier 156 extracts a question from question information, which is stored in the information storage 154, in accordance with a predetermined rule, and notifies the question through, for example, a notification device such as a car navigation system. Here, the predetermined rule includes the number and the order of questions to be notified, among a plurality of questions prepared beforehand. The reply acquirer 158 acquires a reply to the notified question through a user interface. The vehicle characteristic specifier 160 specifies vehicle characteristics based on the reply. The vehicle characteristic setter 162 sets the specified vehicle characteristics in the present vehicle.

Hereafter, a vehicle characteristic setting process, through which the information storage 154, the information notifier 156, the reply acquirer 158, the vehicle characteristic specifier 160, and the vehicle characteristic setter 162 set vehicle characteristics, will be described in detail. Here, the method of setting vehicle characteristics that is a feature of the present embodiment will be described in detail, and description of configurations irrelevant to the features of the present embodiment will be omitted.

Vehicle Characteristic Setting Process

Figure 2:
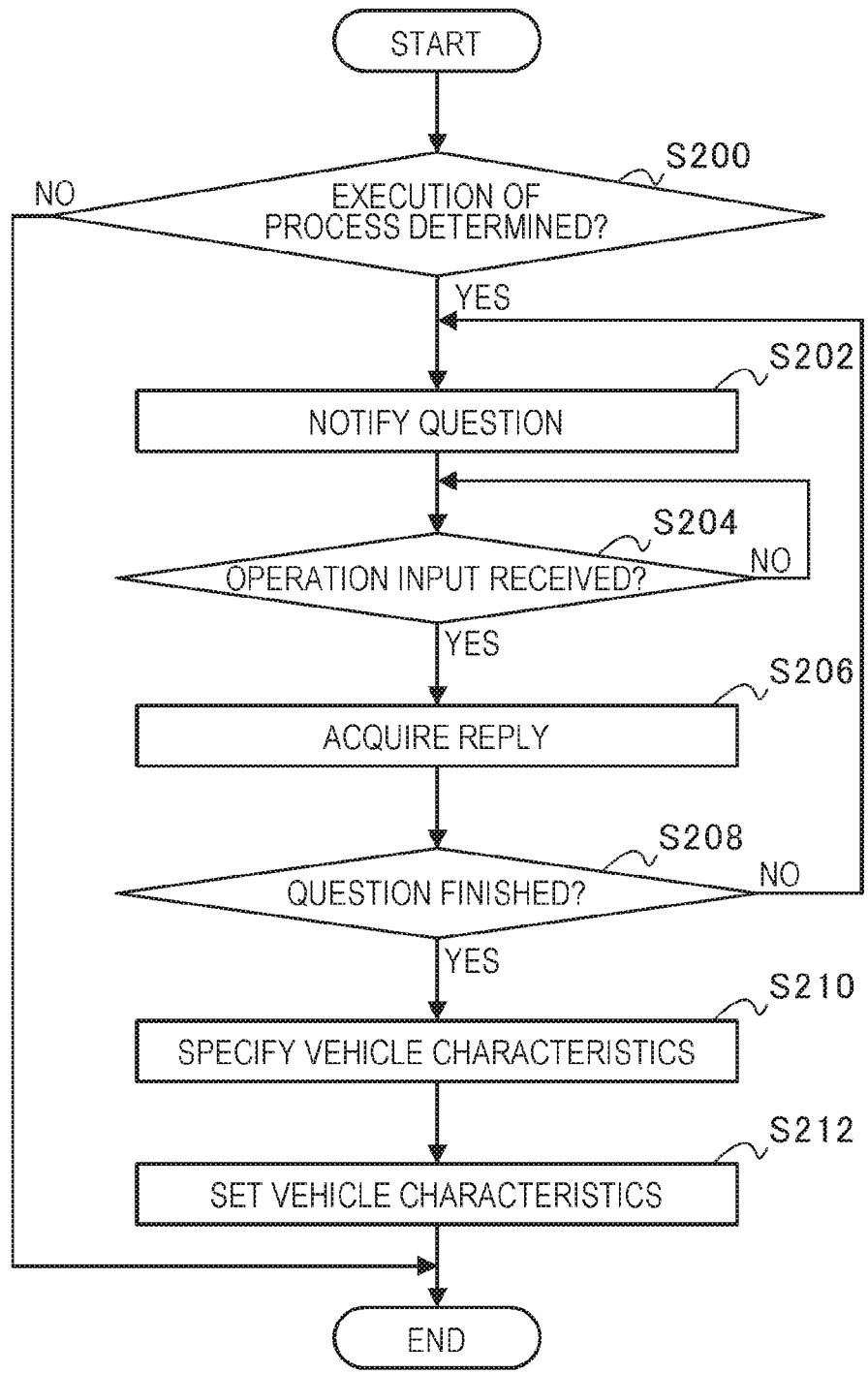
FIG. 2 is a flowchart illustrating a vehicle characteristic setting process.
Figure 3:
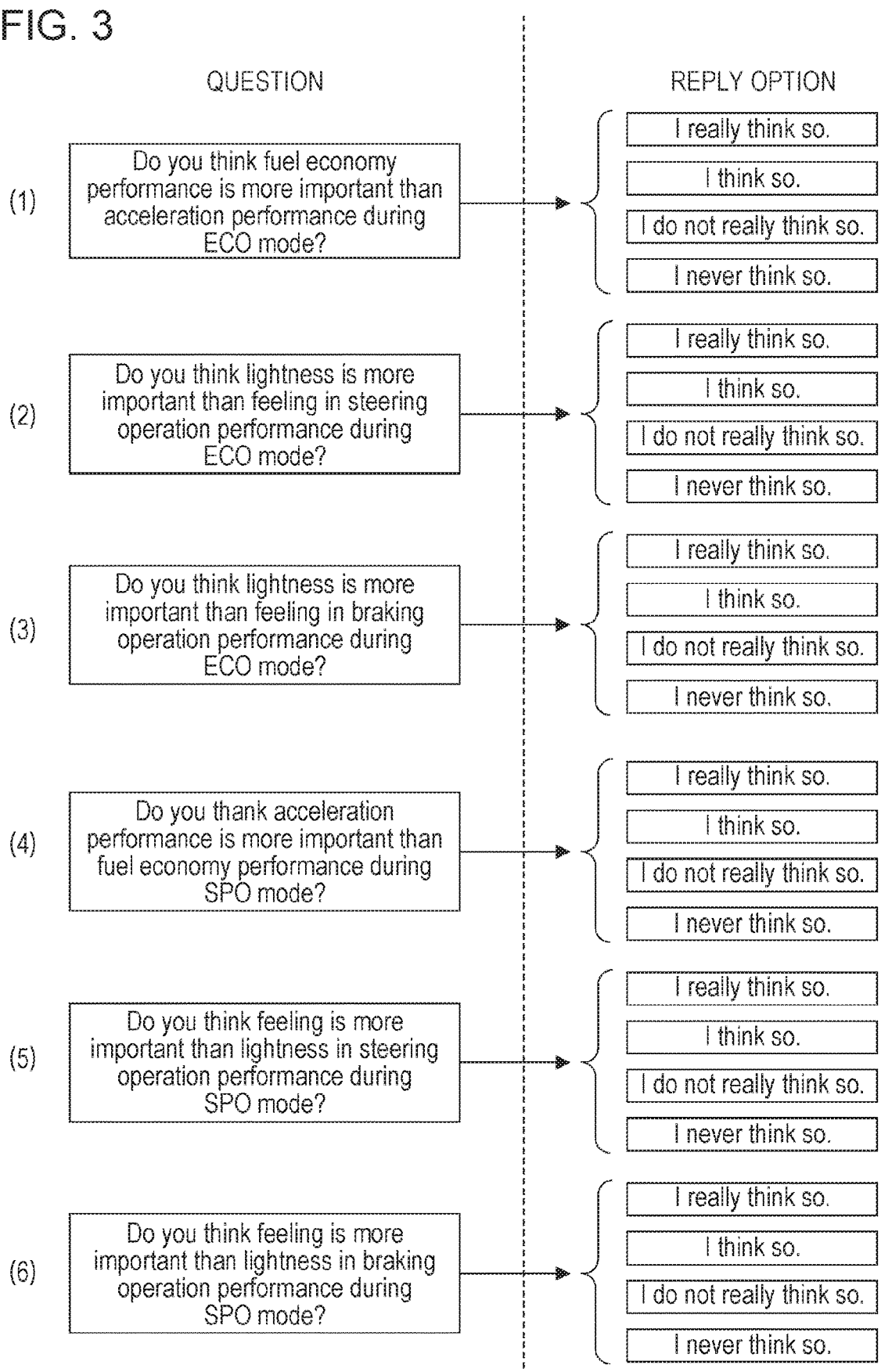
FIG. 3 illustrates the vehicle characteristic setting process.

FIG. 2 is a flowchart illustrating the vehicle characteristic setting process, and FIG. 3 illustrates the vehicle characteristic setting process. The vehicle characteristic setting process is performed when, for example, a user newly purchases a vehicle 1.

Here, it is assumed that, as the driving modes of the vehicle 1, an ECO (economy) mode prioritizing fuel economy and an SPO (sport) mode prioritizing acceleration are prepared. Then, detailed vehicle characteristics when each mode is selected are set. The driving modes are not limited to the ECO mode and the SPO mode. The number of driving modes is not limited to two and may be three or more.

As vehicle characteristics, acceleration performance, fuel economy performance, steering operation performance, and braking operation performance will be described. The acceleration performance is an indicator of the acceleration of the vehicle 1 in response to an operation of the accelerator pedal 124. The fuel economy performance is an indicator of driving distance per unit volume of fuel. The steering operation performance is an indicator of force applied to the steering wheel in order to perform steering by the same angle. The braking operation performance is an indicator of force applied to the brake pedal 126 in order to obtain the same breaking power.

Here, for convenience of description, the acceleration performance, the fuel economy performance, the steering operation performance, and the braking operation performance are described as vehicle characteristics. In addition, it is possible to use various other characteristics of the vehicle 1 that can be changed, such as suspension strength, transmission performance, and air-conditioning performance.

First, the information notifier 156 determines whether execution of the vehicle characteristic setting process has been determined (S200). If execution of the vehicle characteristic setting process has not been determined ("NO" in S200), nothing is performed, and the vehicle characteristic setting process is finished. Execution of the vehicle characteristic setting process determined, for example, in response to a manual operation by the driver or by automatically recognizing that the driver has changed (to a new driver) by using an in-car camera.

If execution of the vehicle characteristic setting process has been determined ("YES" in S200), the information notifier 156 extracts one question in accordance with a predetermined rule from the question information stored in the information storage 154, and notifies the question through a notification device such as a car navigation system (S202).

The notification device is not limited to a car navigation system, and may be a mobile terminal, such as a smartphone, which is communicable with the vehicle 1, or may be a speaker that outputs a question in sound.

Here, as illustrated in (1) of FIG. 3, a question "Do you think fuel economy performance is more important than acceleration performance during the ECO mode?" is notified through the notification device.

After the question is notified through the notification device, the reply acquirer 158 waits for an operation input by the driver ("NO" in S204). Here, if the reply acquirer 158 receives an operation input by the driver through a touch-panel function of the car navigation system ("YES" in S204), the reply acquirer 158 acquires a reply of the driver to the notified question (S206). For example, in (1) of FIG. 3, when the driver touches one of reply options: "I really think so.", "I think so.", "I do not really think so.", and "I never think so.", the reply acquirer 158 acquires the touched item as the reply. A device that receives the reply is not limited to a car navigation system, and may be a mobile terminal, such as a smartphone, which is communicable with the vehicle 1, or may be a microphone for imputing sound.

The information notifier 156 determines whether asking of questions in the question information has finished (S208). If asking of the questions has not finished ("NO" in S208), the process from step S202 is repeated. At this time, as illustrated in FIG. 3, the questions and the reply options shift in order of (1)→(2)→(3)→(4)→(5)→(6).

If asking of the questions in the question information has finished, that is, if the reply of (6) of FIG. 3 is acquired ("YES" in S208), the vehicle characteristic specifier 160 specifies vehicle characteristics based on the replies (S210). Lastly, the vehicle characteristic setter 162 sets the specified vehicle characteristics in the present vehicle (S212).

Figure 5:
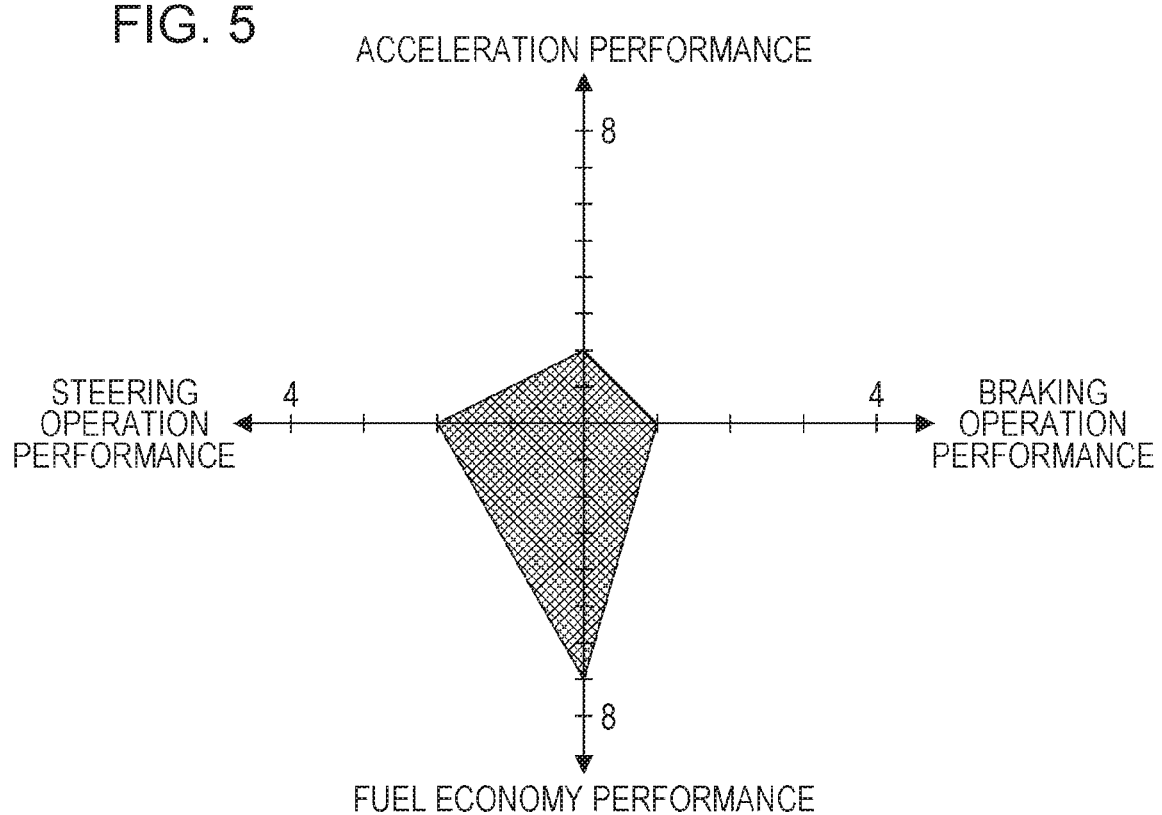
FIG. 5 illustrates a specific aspect of vehicle characteristics.
Figure 6:
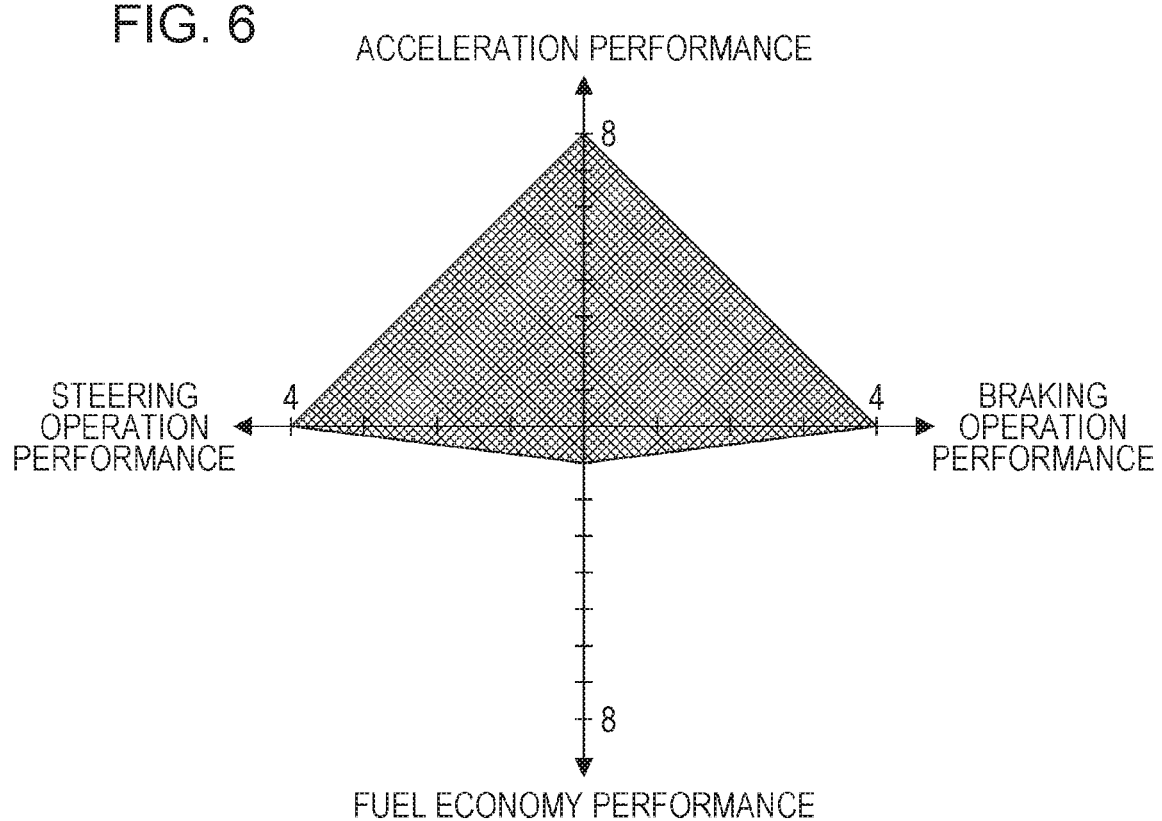
FIG. 6 illustrates a specific aspect of vehicle characteristics.

FIGS. 4 to 6 illustrate specific aspects of vehicle characteristics. For example, to the question "Do you think fuel economy performance is more important than acceleration performance during the ECO mode?" in (1) of FIG. 4, if the driver replies "I really think so.", the acceleration performance during the ECO mode is set to 1 point, and the fuel economy performance during the ECO mode is set to 8 points. If the driver replies "I think so.", the acceleration performance during the ECO mode is set to 2 points, and the fuel economy performance during the ECO mode is set to 7 points. If the driver replies "I do not really think so.", the acceleration performance during the ECO mode is set to 3 points, and the fuel economy performance during the ECO mode is set to 6 points. If the driver replies "I never think so.", the acceleration performance during the ECO mode is set to 4 points, and the fuel economy performance during the ECO mode is set to 5 points.

The higher the point for the acceleration performance, the higher the acceleration of the vehicle 1 in response to an operation of the accelerator pedal 124. The higher the point for the fuel economy performance, the longer the driving distance per unit volume of fuel. The higher the point, for the steering operation performance, the larger a force applied to the steering wheel in order to perform steering by the same angle. The higher the point for the braking operation performance, the larger a force applied to the brake pedal 126 in order to obtain the same breaking power. Since there is generally a trade-off between the acceleration performance and the fuel economy performance, the fuel economy performance decreases as the acceleration performance increases.

To the question "Do you think lightness is more important than feeling in steering operation performance during the ECO mode?" in (2) of FIG. 4, if the driver replies "I really think so.", the steering operation performance during the ECO mode is set to 1 point. If the driver replies "I think so.", the steering operation performance during the ECO mode is set to 2 points. If the driver replies "I do not really think so.", the steering operation performance during the ECO mode is set to 3 points. If the driver replies "I never think so.", the steering operation performance during the ECO mode is set to 4 points.

To the question "Do you think lightness is more important than feeling in braking operation performance during the ECO mode?" in (3) of FIG. 4, if the driver replies "I really think so.", the braking operation performance during the ECO mode is set to 1 point. If the driver replies "I think so.", the braking operation performance during the ECO mode is set to 2 points. If the driver replies "I do not really think so.", the braking operation performance during the ECO mode is set to 3 points. If the driver replies "I never think so.", the braking operation performance during the ECO mode is set to 4 points.

To the question "Do you thank acceleration performance is more important than Tel economy performance during the SPO mode?" in (4) of FIG. 4, if the driver replies "I really think so.", the acceleration performance during the SPO mode is set to 8 points, and the fuel economy performance during the SPO mode is set to 1 point. If the driver replies "I think so.", the acceleration performance during the SPO mode is set to 7 points, and the fuel economy performance during the SPO mode is set to 2 points. If the driver replies "I do not really think so.", the acceleration performance during the SPO mode is set to 6 points, and the fuel economy performance during the SPO mode is set to 3 points. If the driver replies "I never think so.", the acceleration performance during the SPO mode is set to 5 points, and the fuel economy performance during the SPO mode is set to 4 points.

To the question "Do you think feeling is more important than lightness in steering operation performance during the SPO mode?" in (5) of FIG. 4, if the driver replies "I really think so.", the steering operation performance during the SPO mode is set to 4 points. If the driver replies "I think so.", the steering operation performance during the SPO mode is set to 3 points. If the driver replies "I do not really think so.", the steering operation performance during the SPO mode is set to 2 points. If the driver replies "I never think so.", the steering operation performance during the SPO mode is set to 1 point.

To the question "Do you think feeling is more important than lightness in steering operation performance during the SPO mode?" in (6) of FIG. 4, if the driver replies "I really think so.", the braking operation performance during the SPO mode is set to 4 points. If the driver replies "I think so.", the braking operation performance during the SPO mode is set to 3 points. If the driver replies "I do not really think so.", the braking operation performance during the SPO mode is set to 2 points. If the driver replies "I never think so.", the braking operation performance during the SPO mode is set to 1 point.

For example, regarding the ECO mode, when the acceleration performance is set to 2 points, the fuel economy performance is set to 7 points, the steering operation performance is set to 2 points, and the braking operation performance is set to 1 point, the performance radar chart during the ECO mode is determined as illustrated in FIG. 5.

Regarding the SPO mode, when the acceleration performance is set to 8 points, the fuel economy performance is set to 1 point, the steering operation performance as set to 4 points, and the braking operation performance is set to 4 points, the performance radar chart during the SPO mode is determined as illustrated in FIG. 6.

Here, in order to prevent inversion of the priorities in the driving modes, which are the ECO mode prioritizing fuel economy and the SPO mode prioritizing acceleration, the maximum of acceleration performance during the ECO mode is 4 points, the minimum of fuel economy performance during the ECO mode is 5 points, the minimum of acceleration performance during the SPO mode is 5 points, and the maximum of fuel economy performance during the SPO mode is 4 points.

With such configuration, the driver not only can switch the driving mode between the ECO mode and the SPO mode but also can set detailed vehicle characteristics in the mode with sufficient options. Thus, the driver can perform driving with appropriate vehicle characteristics.

In the example described here, absolute replies are acquired regarding acceleration performance, fuel economy performance, steering operation performance, and braking operation performance. However, when it is desirable to change the current vehicle characteristics, relative replies may be acquired regarding the current acceleration performance, the current fuel economy performance, the current steering operation performance, and the current braking operation performance.

For example, to the question "Do you think fuel economy performance is more important than acceleration performance during the ECO mode?", if the driver replies "I really think so.", the acceleration performance during the ECO mode is reduced by 2 points, and the fuel economy performance during the ECO mode is increased by 2 points. If the driver replies "I think so.", the acceleration performance during the ECO mode is reduced by 1 point, and the fuel economy performance during the ECO mode is increased by 1 point. If the driver replies "I do not really think so.", the acceleration performance during the ECO mode is increased by 1 point, and the fuel economy performance during the ECO mode is reduced by 1 point. If the driver replies "I never think so.", the acceleration performance during the ECO mode is increased by 2 points, and the fuel economy performance during the ECO mode is reduced by 2 points.

The vehicle characteristic setter 162 sets vehicle characteristics that have been specified as described above in the present vehicle. For example, setting of the acceleration performance and the fuel economy performance can be realized by the ECU by changing the target level of the rotation speed of the engine in response to an operation of the accelerator pedal 124. In general, the acceleration performance increases when the target level of the rotation speed is increased rapidly, and the fuel economy performance increases when increase of the target level of the rotation speed is limited.

Setting of the steering operation performance can be realized by changing the control variable of the electric power steering. Setting of the braking operation performance can be realized by changing the control variable of an electric negative pressure pump that assists the tread force of the brake pedal 126.

The vehicle characteristic setter 162 may automatically set the specified vehicle characteristics in the present vehicle. However, the vehicle characteristic setter 162 may set the specified vehicle characteristics after confirming with the driver, in order to prevent unpleasant sensation due to sudden change in vehicle characteristics.

For example, first, the information notifier 156 notifies the vehicle characteristics specified by the vehicle characteristic specifier, such as the two performance radar charts illustrated in FIGS. 5 and 6, and a question "Do you want to change vehicle characteristics?" through a notification device. The vehicle characteristic setter 162 sets the vehicle characteristics specified in accordance with an operation input from the driver allowing the vehicle characteristics, such as an operation input of "Yes", in the present vehicle.

With such configuration, the driver can visually recognize the vehicle characteristics after change and can allow the change in vehicle characteristics only when the driver is satisfied with the vehicle characteristics.

Thus, the driver can set not only the driving mode but also detailed vehicle characteristics in the mode with sufficient options.

However, even when the vehicle characteristics are established as described above, the vehicle characteristics are effective only for the vehicle. Accordingly, when the driver newly purchases a vehicle or replaces the vehicle with another vehicle, the driver has to set vehicle characteristics again. Then, it takes time to regain vehicle characteristics that satisfy the driver. Moreover, since the method of setting vehicle characteristics differ between vehicles, it may not be possible to manually reproduce previously established vehicle characteristics.

Thus, it is desirable that the established vehicle characteristics be transferable to another vehicle, so that the driver can perform driving with appropriate vehicle characteristics irrespective of change of vehicle.

First, in the vehicle 1 (first vehicle) in which vehicle characteristics have been set, the information storage 154 stores vehicle characteristic information representing the vehicle characteristics. The information output unit 164 outputs the stored vehicle characteristic information to a predetermined storage medium. Then, in another vehicle 1 (second vehicle) to which the vehicle characteristics are to be newly transferred, the information input unit 166 inputs the vehicle characteristic information from the storage medium. The vehicle characteristic setter 162 sets the vehicle characteristics represented by the input vehicle characteristic information in the other vehicle 1.

Hereafter, a vehicle characteristic transfer process, through which the information storage 154, the information output unit 164, the information input unit 166, and the vehicle characteristic setter 162 transfer vehicle characteristics, will be described in detail. Here, the method of transferring vehicle characteristics that is a feature of the present embodiment will be described in detail, and description of configurations irrelevant to the features of the present embodiment will be omitted.

Vehicle Characteristic Transfer Process

FIG. 7 is a flowchart illustrating a vehicle characteristic transfer process, and FIG. 8 illustrates the vehicle characteristic transfer process. The vehicle characteristic transfer process is performed when, for example, the driver replaces the vehicle 1 with another vehicle 1.

The information storage 154 stores vehicle characteristic information representing vehicle characteristics set by the vehicle characteristic setter 162 (S300). Here, the vehicle characteristic information is stored in a format that has been made common to or standardized for a plurality of types of vehicles 1. For example, acceleration performance, fuel economy performance, steering operation performance, and braking operation performance are each converted into a value whose maximum value is 100. If vehicle characteristics have not been set by the vehicle characteristic setter 162, initial values preset in the vehicle 1 are converted into vehicle characteristic information.

For example, regarding the ECO mode, when the acceleration performance is set to 2 points, the fuel economy performance is set to 7 points, the steering operation performance is set to 2 points, and the braking operation performance is set to 1 point, the vehicle characteristic information is as follows: the acceleration performance is 25 (100×2/8), the fuel economy performance is 88 (100×7/8), the steering operation performance is 50 (100×2/4), and the braking operation performance is 25 (100×1/4).

Regarding the SPO mode, when the acceleration performance is set to 8 points, the fuel economy performance is set to 1 point, the steering operation performance is set to 4 points, and the braking operation performance is set to 4 points, the vehicle characteristic information acceleration performance is 100 (100×8/8), the fuel economy performance is 13 (100×1/8), the steering operation performance is 100 (100×4/4), and the braking operation performance is 100 (100×4/4).

As indicated by a blank arrow in FIG. 8, the information output unit 164 outputs the stored vehicle characteristic information to a predetermined storage medium (S302). Here, an external memory, such as a USB memory or an SD card, can be used as the storage medium. The information output unit 164 outputs the vehicle characteristic information to the external memory through wired connection. The vehicle characteristic information may be output at any time and any number of times. That is, at any time, vehicle characteristic information at the time can be output.

An application that acquires the vehicle characteristic information may be downloaded to a mobile terminal, such as a smartphone, of the driver, and the information output unit 164 may output the vehicle characteristic information to the mobile terminal via wired connection or wireless connection.

A storage medium may be provided in an operation key that allows locking and unlocking of the vehicle 1 by remote operation, and the information output unit 164 may output the vehicle characteristic information to the operation key via wireless connection.

When the vehicle 1 can perform wireless communication with another vehicle 1 or an appropriate server (not shown), the information output unit 164 may output the vehicle characteristic information to the other vehicle 1 or the server via wireless connection.

The server may be a stand-alone computer, or may be a cloud computer that is a virtualized computer including a plurality of computers that are connected to each other via a network.

Thus, it is possible to extract vehicle characteristics as information from the vehicle 1 that the driver has driven and has become accustomed to driving.

Then, when the storage medium is newly connected to another vehicle 1, as indicated by a black arrow in FIG. 8, the information input unit 166 inputs the vehicle characteristic information from the storage medium (S304).

The vehicle characteristic setter 162 sets vehicle characteristics represented by the vehicle characteristic information input from the storage medium in the other vehicle 1 (S306).

Thus, it is possible to transfer the vehicle characteristics that satisfy the driver at the time to another vehicle 1, so that the driver can drive the other vehicle 1 with appropriate vehicle characteristics irrespective of change of vehicle.

For example, in car sharing service, once the driver has set appropriate vehicle characteristics in the vehicle 1, thereafter, by only copying the vehicle characteristics, the driver can reproduce, in another vehicle 1 that the driver uses in the sharing service, the same vehicle characteristics as those of the vehicle 1 that the driver drove in the past.

Here, an example in which the combination of the information output unit 164 and the information input unit 166 transfers vehicle characteristic information has been described. Such configuration can be applied to various technologies.

For example, vehicle characteristics for another driver can be acquired by independently generating variety of vehicle characteristic information. As an example, by copying vehicle characteristics of a vehicle 1 owned by a racing driver and storing the vehicle characteristics in a storage medium (driving method card), the information input unit 166 can transfer the vehicle characteristic information into the present vehicle, and the vehicle characteristic setter 162 can set the vehicle characteristics used by the racing driver in the present vehicle.

By replicating average vehicle characteristics of vehicles that the driver has previously owned and by storing those in a storage medium, the information input unit 166 can transfer the vehicle characteristic information into the present vehicle, and the vehicle characteristic setter 162 can set the vehicle characteristics in the present vehicle. Then, the driver can perform driving with the vehicle characteristics with nostalgia even though the vehicle 1 has changed.

Assuming such use, in order to temporarily store vehicle characteristics at the time, the information output unit 164 outputs the stored vehicle characteristic information to a storage medium. For example, the information output unit 164 may output vehicle characteristics to the storage medium every time the driver changes vehicle characteristics or at a predetermined interval such as one year, so that the driver will be able to retrieve the past vehicle characteristics in the same vehicle 1 when the driver wishes or to reproduce the past vehicle characteristics in another vehicle 1.

For example, in a case where a family used to make a trip always by using one vehicle 1, when a child becomes independent from the parents and the child purchases a new vehicle 1, the child can drive the vehicle 1 by reproducing the vehicle characteristics to which the family was accustomed.

A program that causes a computer to function as the vehicle 1 and a storage medium that records the program, such as a computer-readable flexible disk, a magneto-optical disk, a ROM, a CD, a DVD, or a BD, are also provided. Here, the term "program" refers to data processing means that is written in any language with any method.

Heretofore, embodiments of the disclosure have been described with reference to the drawings. The disclosure is not limited to these embodiments. A person having ordinary skill in the art can conceive modifications and adjustments within the scope described in the claims, and such modifications and adjustments are also included in the scope of the disclosure.

In the embodiments described above, the information storage 154 stores vehicle characteristics that are set by the vehicle characteristic setter 162, in other words, stores vehicle characteristic information representing vehicle characteristics obtained through the vehicle characteristic setting process. However, vehicle characteristics stored by the information storage 154 are not limited to this, and may be any vehicle characteristics set in the vehicle 1. For example, the information storage 154 may store vehicle characteristics that are appropriately set by using a machine learning model in accordance with the driving position and the driving environment. In this case, the information storage 154 may use vehicle characteristics themselves as vehicle characteristic information or may store the machine learning model formed in this way as vehicle characteristic information. In this case, the machine learning model is transferred to another vehicle 1.

Each process in the present specification, such as the vehicle characteristic setting process or the vehicle characteristic transfer process, need not be performed in time series in the order described in the flowchart, may be performed parallelly, or may include subroutine processes.

The vehicle control device 150 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle control device 150 including the information storage 154, the information notifier 156, the reply acquirer 158, the vehicle characteristic specifier 160, and the vehicle characteristic setter 162. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle comprising driving modes and a controller configured to:
   extract a question from stored question information in accordance with a predetermined rule and notify the question through a notification device;
   acquire a reply to the notified question;
   specify a vehicle characteristic on a basis of the reply, wherein specifying the vehicle characteristic comprises setting a point indicating a degree of the vehicle characteristic for the driving modes on a basis of the reply, wherein the point is restricted to less than an upper limit or more than a lower limit for at least one or more of the driving modes, and wherein the upper limit and the lower limit differ for the respective driving modes; and
   set the specified vehicle characteristic in the vehicle.

2. The vehicle according to claim 1, wherein the controller is further configured to:
   notify the vehicle characteristic specified by the vehicle characteristic specifier through a notification device, and
   set the specified vehicle characteristic in the vehicle in response to an operation input from a driver allowing the vehicle characteristic.

3. A vehicle comprising:
   circuitry configured to:
      extract a question from stored question information in accordance with a predetermined rule,
      notify the question through a notification device,
      acquire a reply to the notified question,
      specify a vehicle characteristic on a basis of the reply, wherein specifying the vehicle characteristic comprises setting a point indicating a degree of the vehicle characteristic for driving modes of the vehicle on a basis of the reply, wherein the point is restricted to less than an upper limit or more than a lower limit for at least one or more of the driving modes, and wherein the upper limit and the lower limit differ for the respective driving modes, and
      set the specified vehicle characteristic in the vehicle.

4. The vehicle of claim 1,
wherein stored question information includes at least one question related to:
   whether a user thinks fuel economy performance is more important than acceleration performance,
   whether the user thinks lightness is more important than feels in steering operation performance, or
   whether the user thinks lightness is more important than feeling in braking operation performance.

5. The vehicle of claim 1,
wherein stored question information includes at least one question related to:
   whether a user thinks acceleration performance is more important than fuel economy performance,
   whether the user thinks feels is more important than lightness in steering operation performance, or
   whether the user thinks feeling is more important than lightness in braking operation performance.

6. The vehicle of claim 1, wherein
the the point respectively increases or decreases at least one performance characteristic of the vehicle corresponding to the extracted question.

7. The vehicle of claim 3, wherein
the the point respectively increases or decreases at least one performance characteristic of the vehicle corresponding to the extracted question.

* * * * *